(12) United States Patent
Chen et al.

(10) Patent No.: US 11,636,646 B2
(45) Date of Patent: Apr. 25, 2023

(54) METHOD AND APPARATUS FOR RENDERING IMAGE

(71) Applicant: BEIJING BAIDU NETCOM SCIENCE AND TECHNOLOGY CO., LTD., Beijing (CN)

(72) Inventors: Ruizhi Chen, Beijing (CN); Xinhang Yang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 31 days.

(21) Appl. No.: 17/211,600

(22) Filed: Mar. 24, 2021

(65) Prior Publication Data
US 2021/0209837 A1 Jul. 8, 2021

(30) Foreign Application Priority Data
Sep. 27, 2020 (CN) .......................... 202011033517.2

(51) Int. Cl.
G06T 15/50 (2011.01)
G06T 7/90 (2017.01)

(52) U.S. Cl.
CPC ............. *G06T 15/506* (2013.01); *G06T 7/90* (2017.01); *G06T 2207/10024* (2013.01); *G06T 2207/30201* (2013.01)

(58) Field of Classification Search
CPC .............. G06T 15/506; G06T 7/90; G06T 2207/10024; G06T 2207/30201
USPC ........................................................ 382/165
See application file for complete search history.

(56) References Cited

U.S. PATENT DOCUMENTS 8,031,936 B2 * 10/2011 Dempski .................. G06T 7/90
382/164
9,288,374 B1 * 3/2016 Cooper ............. H04N 5/23222
2018/0005448 A1 1/2018 Choukroun et al.
(Continued)

FOREIGN PATENT DOCUMENTS

JP 2008-530628 A 8/2008
KR 10-2019-0021390 A 3/2019
WO 2010/087162 A1 8/2010

OTHER PUBLICATIONS

Hu et al., "Avatar digitization from a single image for real-time rendering," ACM Transactions on Graphics, vol. 36, No. 6, Article 1, Nov. 2017, 14 pages.
(Continued)

*Primary Examiner* — Gabriel I Garcia
(74) *Attorney, Agent, or Firm* — Seed IP Law Group LLP (57) ABSTRACT

Embodiments of the present disclosure discloses a method and apparatus for rendering an image, an electronic device and a computer readable storage medium. An example implementation of the method includes: acquiring a real color parameter and a face skin color parameter in a real user image including a face image area, determining lighting parameter information based on the real color parameter and the face skin color parameter, acquiring a to-be-rendered image obtained based on the real user image, and generating a texture parameter based on the lighting parameter information, and using the texture parameter to perform lighting rendering on the to-be-rendered image to obtain a rendered image.

15 Claims, 9 Drawing Sheets

(56) References Cited

U.S. PATENT DOCUMENTS

2018/0174348 A1 6/2018 Bhat et al.
2021/0390770 A1* 12/2021 Kuo ..................... G06T 15/04

OTHER PUBLICATIONS

Partial European Search Report for European Application No. 21 16 6272, dated Jan. 13, 2022, 3 pages.
Thies et al., "Real-time Expression Transfer for Facial Reenactment," ACM Transaction on Graphics, Oct. 2015, 14 pages.

* cited by examiner

METHOD AND APPARATUS FOR RENDERING IMAGE

CROSS-REFERENCE TO RELATED APPLICATIONS

This application claims priority to Chinese Patent Application No. 202011033517.2, filed with the China National Intellectual Property Administration (CNIPA) on Sep. 27, 2020, the content of which is incorporated herein by reference in its entirety.

TECHNICAL FIELD

The present disclosure relates to the field of computer technology, in particular to the fields of feature recognition technology, image rendering technology, and deep learning technology, and more particular to a method and apparatus for rendering an image, an electronic device and a computer readable storage medium.

BACKGROUND

With the rise of social networking on the Internet, users increasingly use social software to interact with other users to meet their social needs. In order to further enhance the users' social interaction experience, an interactive gameplay of virtual 3D head model has become a common gameplay in live broadcast, short video and other scenarios. In this gameplay, a host or blogger may load a head model such as cartoon, or animal to cover his real head image to interact with other viewers using the synthesized image. This method can not only increase the entertaining of a video, but also reduce the host's appearance burden.

In the prior art, presented virtual head model effects are all realized at a preset fixed lighting, which produces large deviations from specific lighting backgrounds, and the presented virtual head model effects obviously are not in harmony with the backgrounds.

SUMMARY

Embodiments of the present disclosure provide a method and apparatus for rendering an image, an electronic device and a storage medium.

In a first aspect, an embodiment of the present disclosure provides a method for rendering an image, including: acquiring a real color parameter and a face skin color parameter in a real user image, the real user image including a face image area; determining lighting parameter information based on the real color parameter and the face skin color parameter; acquiring a to-be-rendered image obtained based on the real user image; and generating a texture parameter based on the lighting parameter information, and using the texture parameter to perform lighting rendering on the to-be-rendered image to obtain a rendered image.

In a second aspect, an embodiment of the present disclosure provides an apparatus for rendering an image, including: an image parameter acquisition unit, configured to acquire a real color parameter and a face skin color parameter in a real user image, the real user image including a face image area; a lighting parameter information determination unit, configured to determine lighting parameter information based on the real color parameter and the face skin color parameter; a to-be-rendered image acquisition unit, configured to acquire a to-be-rendered image obtained based on the real user image; and an image rendering unit, configured to generate a texture parameter based on the lighting parameter information, and use the texture parameter to perform lighting rendering on the to-be-rendered image to obtain a rendered image.

In a third aspect, an embodiment of the present disclosure provides an electronic device, the electronic device includes: at least one processor; and a memory, communicatively connected to the at least one processor, the memory storing instructions executable by the at least one processor, the instructions, when executed by the at least one processor, cause the at least one processor to perform the method according to any one of the implementations of the first aspect.

In a fourth aspect, an embodiment of the present disclosure provides a non-transitory computer storage medium, storing computer instructions thereon, the computer instructions, when executed by a processor, causing the processor to perform the method according to any one of the implementations of the first aspect.

According to embodiments of the present disclosure, after a real color parameter and a face skin color parameter in a real user image including a face image area are acquired, lighting parameter information is determined based on the real color parameter and the face skin color parameter, a to-be-rendered image obtained based on the real user image is acquired, and a texture parameter is generated based on the lighting parameter information, and the texture parameter is used to perform lighting rendering on the to-be-rendered image to obtain a rendered image. Based on dynamic skin color information in the real image, the lighting parameter information is dynamically determined, and the corresponding texture parameter is generated to realize dynamic rendering of the rendered image, which reduces a sense of violation of the rendered image and improves the image quality.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to embodiments of the present disclosure, in which.

DETAILED DESCRIPTION OF EMBODIMENTS

The following describes example embodiments of the present disclosure in conjunction with the accompanying drawings, which includes various details of embodiments of the present disclosure to facilitate understanding, and they should be considered as merely exemplary. Therefore, those of ordinary skill in the art should recognize that various changes and modifications may be made to embodiments described herein without departing from the scope and spirit of the present disclosure. Also, for clarity and conciseness, descriptions of well-known functions and structures are omitted in the following description.

It should be noted that embodiments in the present disclosure and the features in embodiments may be combined with each other on a non-conflict basis. Embodiments of the present disclosure will be described below in detail with reference to the accompanying drawings.

Figure 1:
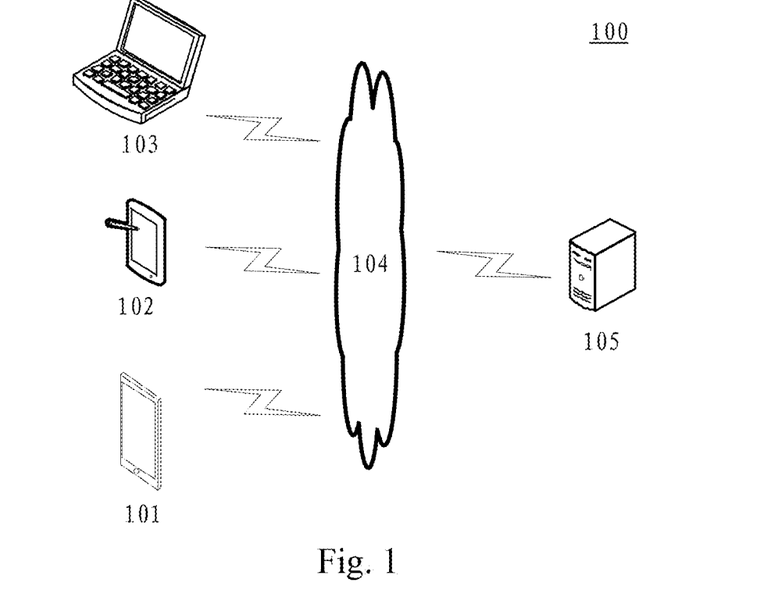
FIG. 1 is a system architecture in which an embodiment of the present disclosure may be implemented.

FIG. 1 illustrates a system architecture 100 of a method and apparatus for rendering an image, an electronic device and a storage medium in which embodiments of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may use the terminal devices 101, 102, 103 to interact with the server 105 through the network 104 to achieve the purpose of sending a rendered image or data stream generated based on rendered images. The terminal devices 101, 102, and 103 may be installed with an application that may provide an image acquisition function, such as an image processing application, a live broadcast application, or a video recording application.

The terminal devices 101, 102, 103 may be hardware or software. When the terminal devices 101, 102, 103 are hardware, they may be various electronic devices having display screens, including but not limited to smart phones, tablet computers, laptop portable computers, desktop computers and the like. When the terminal devices 101, 102, 103 are software, they may be installed in the above-listed electronic devices. They may be implemented as a plurality of software or software modules (such as a module for acquiring a real color parameter and a face skin color parameter in a real user image), or as a single software or software module, which is not specifically limited herein.

The terminal devices 101, 102, 103 may be terminal devices that provide various services, for example, terminal devices that provide a rendered image or data streams generated based on rendered images for the server 105, for example, after acquiring a real color parameter and a face skin color parameter in a real user image including a face image area, based on the real color parameter and the face skin color parameter, determining lighting parameter information, acquiring a to-be-rendered image obtained based on the real user image, generating a texture parameter based on the lighting parameter information, and using the texture parameter to perform lighting rendering on the to-be-rendered image to obtain a rendered image.

It should be noted that the method for rendering an image provided in an embodiment of the present disclosure is generally performed by the terminal device 101, 102, or 103. Accordingly, the apparatus for rendering an image is generally provided in the terminal device 101, 102, or 103. In this regard, the example system architecture 100 may not include the server 105 and the network 104.

It should be noted that the server may be hardware or software. When the server is hardware, it may be implemented as a distributed server cluster composed of a plurality of servers, or as a single server. When the server is software, for example, it may be implemented as a plurality of software or software modules for providing distributed services, or as a single software or software module, which is not particularly limited herein.

In addition, the method for rendering an image may also be performed by the server 105. Accordingly, the apparatus for rendering an image may also be provided in the server 105. In this regard, the example system architecture 100 includes the server 105 and the network 104.

It should be understood that the number of terminal devices, networks, and servers in FIG. 1 is merely illustrative. Depending on the implementation needs, there may be any number of terminal devices, networks, and servers.

Figure 2:
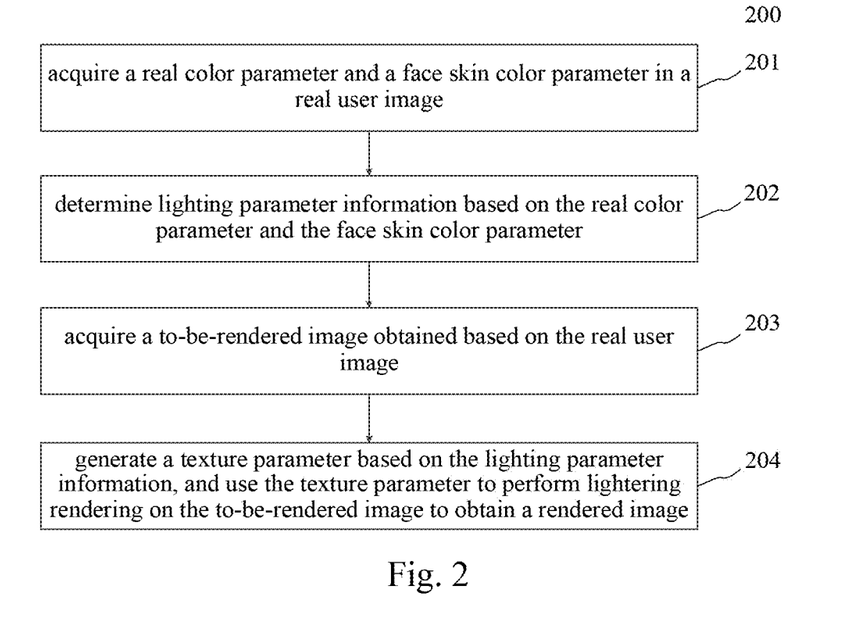
FIG. 2 is a flowchart of a method for rendering an image according to an embodiment of the present disclosure.

With further reference to FIG. 2, a flow 200 of a method for rendering an image according to an embodiment of the present disclosure. The method for rendering an image includes the following steps:

Step 201, acquiring a real color parameter and a face skin color parameter in a real user image.

In the present embodiment, an executing body of the method for rendering an image (for example, the terminal device 101, 102, or 103 shown in FIG. 1) may acquire the real user image including a face image area from a local shooting equipment or a local or non-local human-computer interaction device (for example, the server 105 shown in FIG. 1). The real user image usually refers to a three-dimensional image of a user in a live broadcast collected by an image acquisition device such as a camera of the executing body. Then, based on the user real image, the real color parameter and the face skin color parameter in the real user image are acquired.

The real color parameter and the face skin color parameter refer to the pixel color RGB value of a real color and the pixel color RGB value of a face skin color in the real user image. After acquiring the real user image, the pixel color RGB values, that is, the pixel color RGB values of the real color parameter and the face skin color parameter, of a corresponding pixel area may be extracted from the real user image using a lighting predictor, a lighting prediction model, etc.

It should be understood that the executing body may also directly acquire the real color parameter and the face skin color parameter in the real user image including the face image area from the local or non-local human-computer interaction device.

Step 202, determining lighting parameter information based on the real color parameter and the face skin color parameter.

In the present embodiment, on the basis of the real color parameter and the face skin color parameter determined in step 201, the lighting parameter information is determined based on the real color parameter and the face skin color parameter. A bidirectional reflectance distribution function (BRDF) model or a spherical harmonic lighting algorithm or other methods may be used to estimate parametric lighting, that is, the actual lighting condition feedback from the real user image, based on the real color parameter and the face skin color parameter, to obtain the lighting parameter information in the real user image.

It should be understood that in an embodiment of the present disclosure, the real user image may be obtained based on a three-dimensional scenario. Preferably, after the spherical harmonic lighting algorithm pre-processes the image, a corresponding processing result is obtained and stored, and then high-quality rendering and shadow effects are generated based on the stored information. In this process, it is necessary to use a new lighting equation to replace the conventional lighting equation, to project relevant information in the equation to the frequency space by using a spherical harmonic primary equation and to use coefficients to express the relevant information to store in a certain method.

Figure 3:
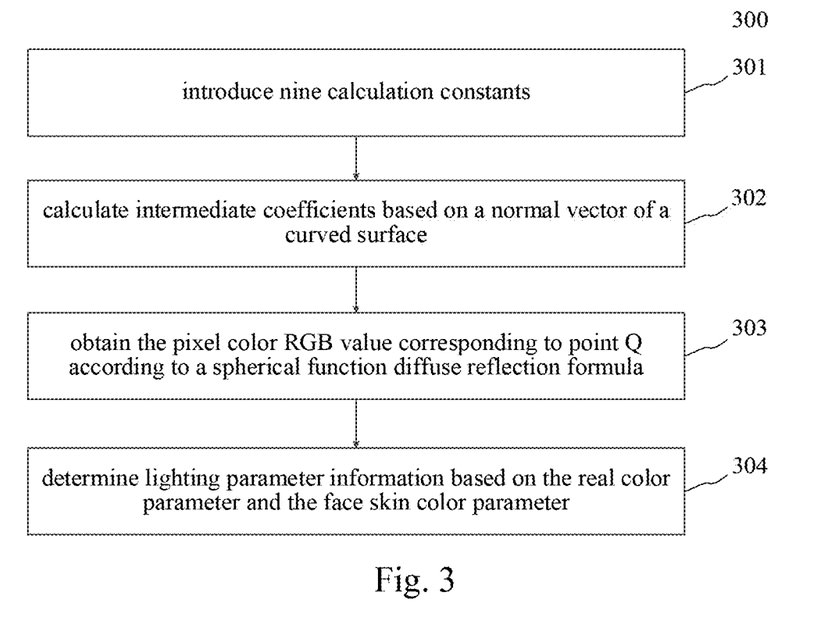
FIG. 3 is a flowchart of an implementation of using a spherical harmonic lighting algorithm to determine lighting parameter information in the method for rendering an image according to an embodiment of the present disclosure.

The process of determining the lighting parameter information using the spherical harmonic lighting algorithm is shown in FIG. 3, which illustrates a flow 300 of an implementation of determining a pixel color RGB value corresponding to a two-dimensional image point Q which corresponds to point P in a three-dimensional image using the spherical harmonic lighting algorithm. It is known that the normal vector of point P are nx, ny, nz, and texture color RGB corresponding to this point is respectively ($T_r$, $T_g$, $T_b$), and the spherical harmonic coefficients of ambient light are also known, which are L0, L1, L2, . . . L8, a rendered pixel result corresponding to the three-dimensional space point P on a rendered image is the two-dimensional image point Q, and steps of obtaining the pixel color RGB value ($Q_r$, $Q_g$, $Q_b$) corresponding to the two-dimensional image point Q include:

Step 301, introducing nine calculation constants.
Specifically, $$a = \sqrt{\frac{\pi}{4}}, b = c = d = \frac{2}{3}\pi\sqrt{4\pi}, e = \frac{\pi}{8}\sqrt{\frac{5}{4\pi}},$$

$$f = g = h = \frac{3}{4}\pi\sqrt{\frac{5}{12\pi}}, i = \frac{3}{8}\pi\sqrt{\frac{5\pi}{12\pi}}.$$

Step 302, calculating intermediate coefficients based on a normal vector of a curved surface.

The normal vector at point P is (nx, ny, nz), which is substituted into calculation formulas:

sh0=a,sh1=b×nx,sh2=c×ny,sh3=d×nz,sh4=e×(3.0×nz×nz−1.0),sh5=f×ny×nz,sh6=g×nx×nz,sh7=h×nx×ny,sh8=i×(nx×nx−ny×ny), the intermediate coefficients sh0-sh8 are obtained.

Step 303, obtaining the pixel color RGB value corresponding to point Q according to a spherical function diffuse reflection formula.

The pixel color RGB value corresponding to point Q is obtained according to the following spherical function diffuse reflection calculation formulas:

$Q_r = T_r \times (sh0 \times L0 + sh1 \times L1 + \ldots + sh9 \times L9)$ $Q_g = T_g \times (sh0 \times L0 + sh1 \times L1 + \ldots + sh9 \times L9)$ $Q_b = T_b \times (sh0 \times L0 + sh1 \times L1 + \ldots + sh9 \times L9)$ After determining the pixel color RGB value corresponding to point Q, the steps may further include:

Step 304, determining lighting parameter information based on the real color parameter and the face skin color parameter.

After obtaining the pixel RGB values corresponding to Q and P, the following conversion relationship between the real color parameter, the face skin color parameter, and the lighting parameter information is constructed according to the spherical harmonic lighting algorithm:

$$Q_{color} = P_{Color} \times SH^T(nx, ny, nz) \times L = P_{Color} \times (sh0\, sh1\, \ldots\, sh8) \times \begin{pmatrix} L0 \\ L1 \\ \ldots \\ L8 \end{pmatrix}$$

Here, $Q_{Color}$ is the RGB value of the real color parameter, $P_{Color}$ is the RGB value of the face skin color parameter, and L is the lighting parameter information.

During the rendering process, particularly when performing content-based feature analysis and transformation on a 3D model, the characteristics of the spherical harmonic transformation and the pre-stored coefficient information are combined to restore an original lighting equation and shading the scenario, so that a dynamic lighting rendering effect is achieved and the rendering effect is provided.

Step 203, acquiring a to-be-rendered image obtained based on the real user image.

In the present embodiment, the to-be-rendered image obtained based on the real user image may be a synthesized image. For example, after the real user image is acquired, a template image is acquired, and the template image is added to a position in the real user image to obtain the to-be-rendered image, that is, the position of the face image included in the real user image is replaced with an image of the content in the template image, for example, an image obtained after replacing the face image in the live broadcast with a dog portrait, a skeleton portrait, etc.

It should be understood that the rendered image obtained based on the real user image may also be an image determined based on such as deforming, stretching the real user image, or an image that needs to be edited to generate using the real user image in the prior art, which is not limited herein.

Step 204, generating a texture parameter based on the lighting parameter information, and using the texture parameter to perform lighting rendering on the to-be-rendered image to obtain a rendered image.

In the present embodiment, based on the lighting parameter information obtained in step 202, the lighting parameter information may be converted into the texture parameter that may be used to perform lighting rendering on the to-be-rendered image obtained in step 203 by using, for example, the OpenGL tool or the CCRenderTexture interface, and then the to-be-rendered image is rendered based on the texture parameter to obtain the rendered image.

The method for rendering an image provided by the embodiment of the present disclosure acquires a real color parameter and a face skin color parameter in a real user image including a face image area, determines lighting parameter information based on the real color parameter and the face skin color parameter, acquires a to-be-rendered image obtained based on the real user image, and generates a texture parameter based on the lighting parameter information, and uses the texture parameter to perform lighting rendering on the to-be-rendered image to obtain a rendered image. Based on skin color information in the real image, the lighting parameter information is dynamically determined, and the corresponding texture parameter is generated to realize dynamic rendering of the rendered image, reduce a sense of violation of the rendered image, and improve the image quality.

Figure 4:
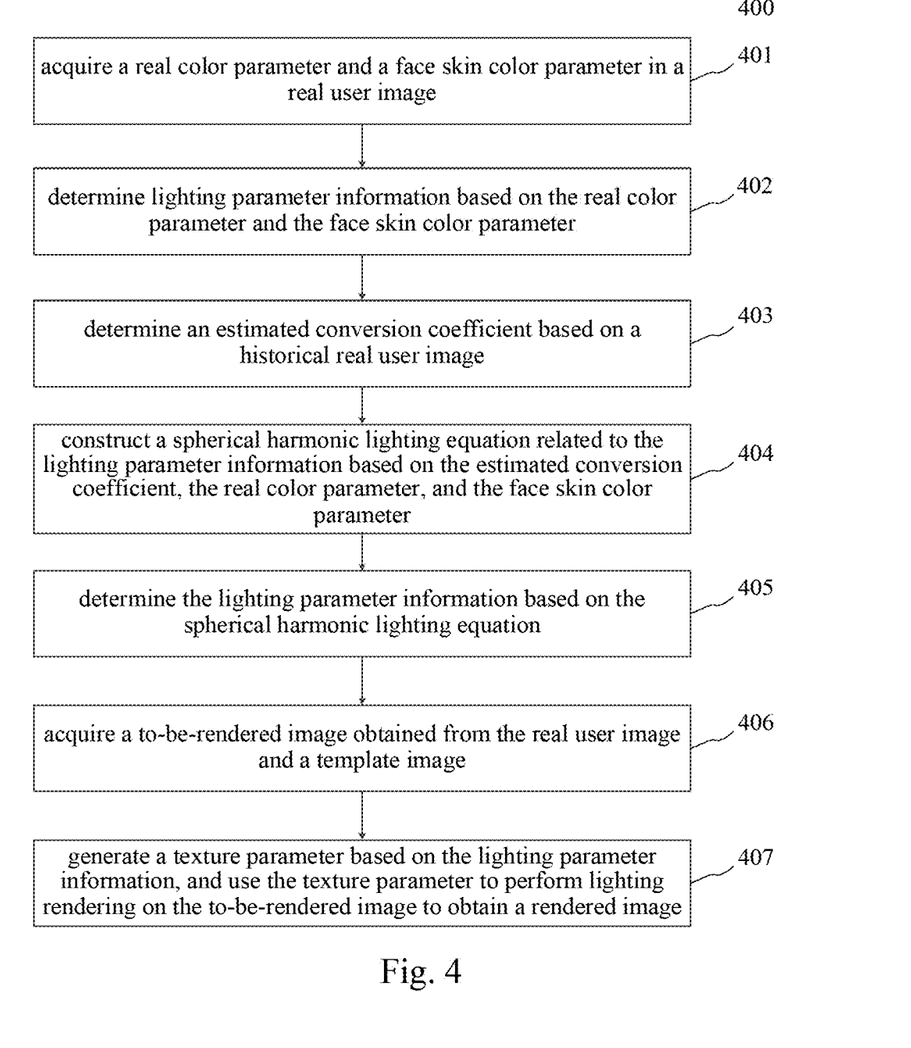
FIG. 4 is a flowchart of a method for rendering an image according to another embodiment of the present disclosure.

With further reference to FIG. 4, illustrating a flow 400 of a method for rendering an image according to another embodiment of the present disclosure. A spherical harmonic lighting algorithm is used to implement the method for rendering an image, including the following steps:

Step 401, acquiring a real color parameter and a face skin color parameter in a real user image.

Step 402, determining lighting parameter information based on the real color parameter and the face skin color parameter.

Step 403, determining an estimated conversion coefficient based on a historical real user image.

In the present embodiment, based on the normal vectors of different face parts in different historical real user images as references, the value of $SH^T(nx,ny,nz)$ in the conversion relationship between the real color parameter, the face skin color parameter, and the lighting parameter information in step 304 in the implementation shown in FIG. 3 is used as the estimated conversion coefficient.

It should be understood that the value of the estimated conversion coefficient $SH^T(nx,ny,nz)$ is a value dynamically changing with changes of the face part, changes of the real color parameter, the face skin color parameter and the lighting parameter information. A set of estimated conversion coefficients may be generated corresponding to the values of estimated conversion coefficients determined under different conditions, so that the estimated conversion coefficients under different conditions may be subsequently acquired based on the set of estimated conversion coefficients.

Step 404, constructing a spherical harmonic lighting equation related to the lighting parameter information based on the estimated conversion coefficient, the real color parameter, and the face skin color parameter.

In the present embodiment, by adopting the same method as in the implementation shown in FIG. 3, the spherical harmonic lighting equation related to the lighting parameter information is constructed, namely:

$$Q_{color} = P_{Color} \times SH^T(nx, ny, nz) \times L = P_{Color} \times (sh0\, sh1\, \ldots sh8) \times \begin{pmatrix} L0 \\ L1 \\ \ldots \\ L8 \end{pmatrix}$$

Here, $Q_{Color}$ is the RGB value of the real color parameter, $P_{Color}$ is the RGB value of the face skin color parameter, and L is the lighting parameter information.

Step 405, determining the lighting parameter information based on the spherical harmonic lighting equation.

In the present embodiment, based on the spherical harmonic lighting equation determined in step 404, the lighting parameter information L is obtained.

Step 406, acquiring a to-be-rendered image obtained from the real user image and a template image.

Step 407, generating a texture parameter based on the lighting parameter information, and using the texture parameter to perform lighting rendering on the to-be-rendered image to obtain a rendered image.

In the present embodiment, after acquiring the to-be-rendered image obtained in the above step 406, the corresponding rendering texture parameter is generated based on the lighting parameter information obtained in step 405. The rendering texture parameter may be $P1_{Color}$ obtained using the spherical harmonic lighting equation, based on the lighting parameter information L and the re-determined estimated conversion coefficient $SH^T(nx,ny,nz)$. $P1_{Color}$ is used as the texture parameter to perform lighting rendering on the to-be-rendered image to obtain the rendered image.

In some alternative implementations of the present embodiment, the using the texture parameter to perform lighting rendering on the to-be-rendered image to obtain the rendered image, includes: using the texture parameter as an updated face skin color parameter; determining updated lighting parameter information based on the real color parameter and the updated face skin color parameter; and determining an updated texture parameter based on the updated lighting parameter information, and using the updated texture parameter to perform the lighting rendering on the to-be-rendered image to obtain the rendered image.

Particularly, the obtained texture parameter may be used as the updated face skin color parameter, then the updated lighting parameter information is determined based on the spherical harmonic lighting equation constructed in step 404 of the present embodiment, and then similarly, the method in above steps 405-407 is used to determine the updated texture parameter, and the updated texture parameter is used to perform lighting rendering on the to-be-rendered image to obtain the rendered image, and the texture parameter is optimized in an iterative manner to further improve the quality of lighting rendering.

In some alternative implementations of the present embodiment, the determining an updated texture parameter based on the updated lighting parameter information, and using the updated texture parameter to perform lighting rendering on the to-be-rendered image to obtain the rendered image, includes: re-determining the updated texture parameter as the updated face skin color parameter, and jumping to execution of the determining updated lighting parameter information based on the real color parameter and the updated face skin color parameter; and determining, in response to the number of times of the execution of the jumping meeting a predetermined threshold condition, a final updated texture parameter, and using the final updated texture parameter to perform the lighting rendering on the to-be-rendered image to obtain the rendered image.

Figure 5:
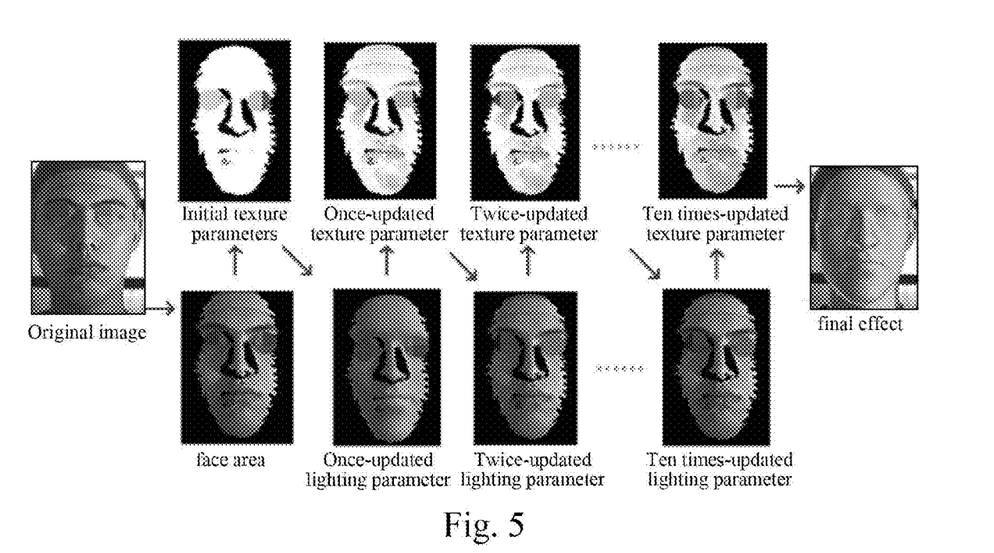
FIG. 5 is an effect schematic diagram of the method for rendering an image according to another embodiment of the present disclosure.

Particularly, based on situation similar to the above embodiment, after the updated texture parameter is determined, the updated texture parameter is determined as the updated face skin color parameter again, so that correspondingly an updated lighting parameter is re-determined based thereon. The cycles of the operations are performed repeatedly. When the number of the execution times of the operations reaches a predetermined number, the final updated texture parameter is determined. An iterative update on the texture parameter is achieved through the repeated cycles of operations, and the final updated texture parameter is determined to approach the lighting situation in the real user image, and the final updated texture parameter is used to perform lighting rendering on the to-be-rendered image to obtain the rendered image, so as to realize a lighting rendering that is closer to the ambient lighting in the real user image. For this process, reference may be made to FIG. 5, which shows an example schematic diagram of an implementation effect of a rendered image finally obtained by the iterative update implemented based on the above cycling method with the number of execution times predetermined as 10.

In some alternative implementations of the present embodiment, the acquiring a real color parameter and a face skin color parameter in a real user image, includes: acquiring the real color parameter and a predetermined face skin color parameter in the real user image.

Particularly, because the lighting parameter in the real user image may be infinitely approached through the iterative manner, so that an alternative solution when the face skin color parameter cannot be accurately acquired may be provided: the standard RGB value of a face skin color parameter may be pre-determined based on a historical real user image, and the lighting parameter in the real user image may be approached by multiple iterations, so as to avoid affecting a rendering quality of the image due to inaccurate acquisition of the face skin color parameter.

For example, $P_{Color}$, that is, the RGB value of the face skin color parameter may be preset to (240, 183, 155), and the lighting parameter information may be obtained by calculation and iteratively updated to determine the final texture parameter.

In the present embodiment, steps 401-402 and step 406 are respectively similar to steps 201-202 and 203 in the embodiment shown in FIG. 2, and detailed description thereof will be omitted. In the present embodiment, the spherical harmonic lighting algorithm is used to dynamically determine the lighting parameter information based on the skin color information in the real image and generate the corresponding texture parameter, to realize dynamic rendering of the rendered image, which reduces a sense of violation of the rendered image and improves the image quality.

Figure 601A:
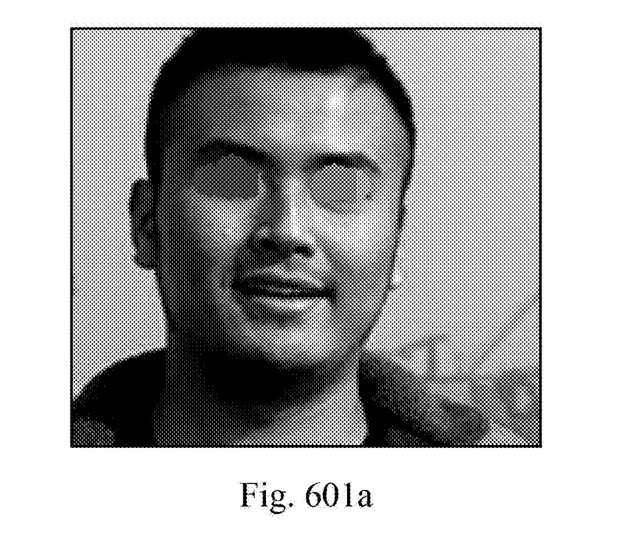
FIGS. 601a, 602a, and 603a are schematic diagrams of real face images in an application scenario of the method for rendering an image according to an embodiment of the present disclosure.
Figure 602A:
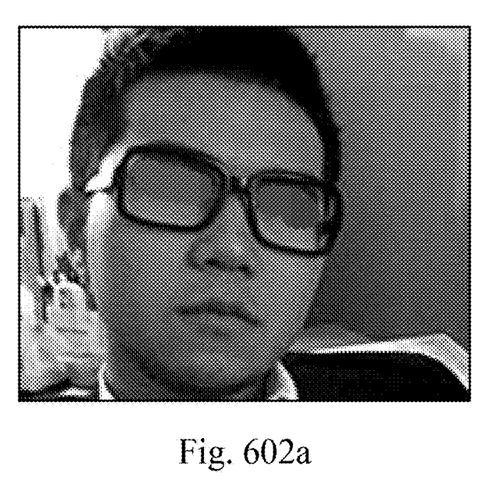
Figure 603A:
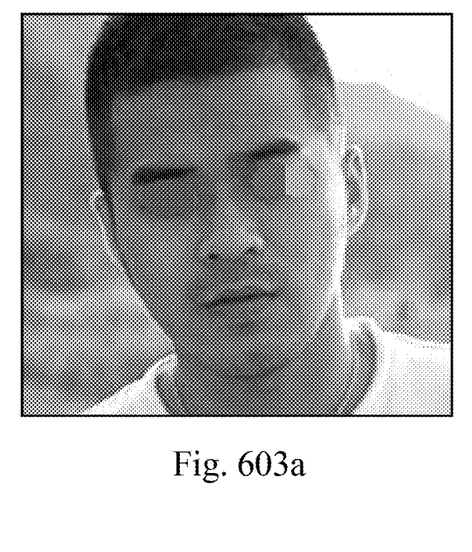

In order to deepen understanding, an implementation scheme in combination with a specific application scenario is provided. To illustrate the method for rendering an image, the implementation scheme includes:

Referring to FIGS. 601*a*, 602*a*, and 603*a*, three different real user images including face areas are shown, the real color parameters A11, A21, A31 and the face skin color parameters B1, B2, B3 in the real user images including face image areas are respectively acquired.

The normal vectors of different face parts in a historical real user image are acquired, to obtain the estimated conversion coefficient $SH^T(nx,ny,nz)$. Taking the real user image 601*a* as an example (the processing processes of the real user images 602*a*, 603*a* are similar to that of the real user image 601*a*, and detailed description thereof will be omitted), based on the face skin color parameter B1 and the real face parameter A11, the constructed spherical harmonic lighting equation is:

$$A11 = B1 \times SH^T(nx,ny,nz) \times L$$

The lighting parameter information L is obtained therefrom, and then a different face skin color parameter B11 (the real user image 602*a* corresponds to different face skin color parameters B21, and the real user image 603*a* corresponds to different face skin color parameters B31) is obtained based on L and a different estimated conversion coefficient, and the B11 is substituted into the above spherical harmonic lighting equation to determine the updated lighting parameter $L_{A11}$ (the updated lighting parameter corresponding to the real user image 602*a* is $L_{A21}$, and the real user image 603*a* corresponds to different face skin color parameters $L_{A31}$).

Figure 601B:
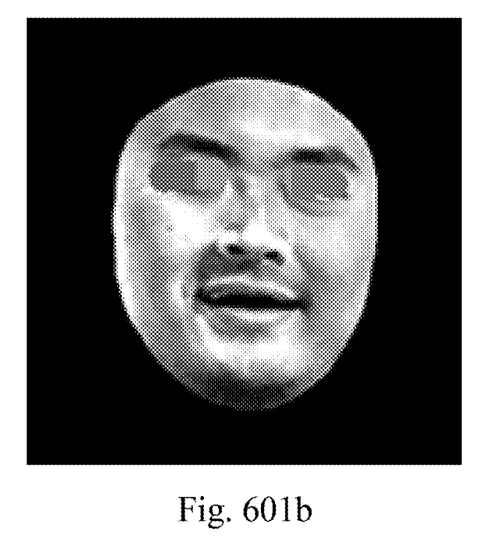
FIGS. 601b, 602b, 603b, 601c, 602c, and 603c are effect schematic diagrams corresponding to 601a, 602a, and 603a in an application scenario of the method for rendering an image according to an embodiment of the present disclosure.
Figure 602B:
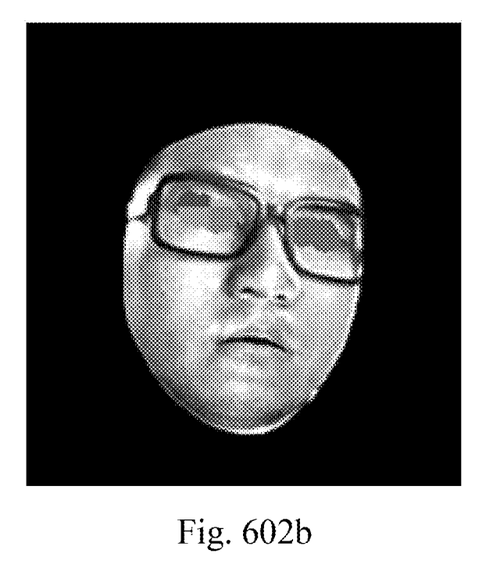
Figure 603B:
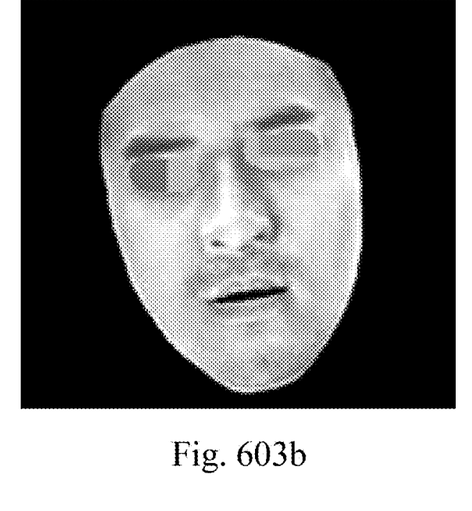

When the real user images 601*a*, 602*a*, and 603*a* are rendered based on the skin color parameters B11, B21, and B31, the render effect diagrams corresponding to the real user images 601*a*, 602*a*, and 603*a* are as shown in FIGS. 601*b*, 602*b*, and 603*b*.

Then, based on the updated lighting parameters $L_{A11}$, $L_{A21}$, $L_{A31}$, the updated face skin color parameters B12, B22, B32 are determined and used as the updated texture parameters B12, B22, B32, and the updated texture parameters B12, B22, B32 are used to perform lighting rendering on the to-be-rendered images to obtain the rendered images.

Figure 601C:
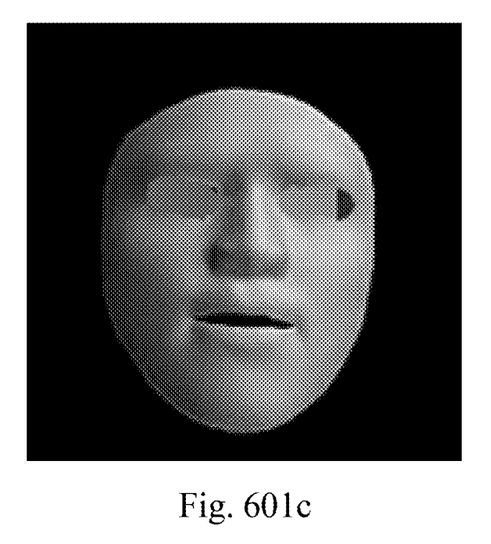
Figure 602C:
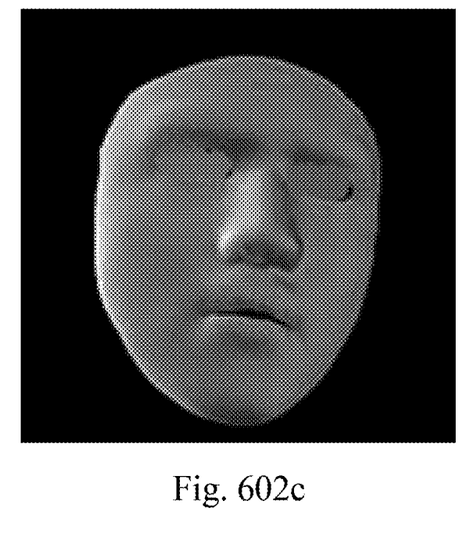
Figure 603C:
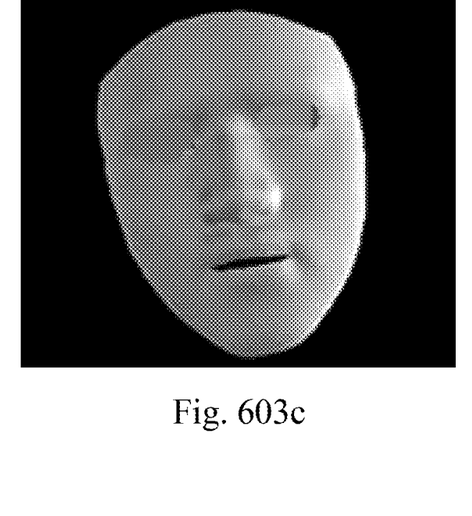

When the updated texture parameters B12, B22, and B32 is used to render the real user images 601*a*, 602*a*, and 603*a*, the render effect diagrams corresponding to the real user images 601*a*, 602*a*, and 603*a* are as shown in FIGS. 601*c*, 602*c*, and 603*c*.

It can be seen from this application scenario that the method for rendering an image in embodiments of the present disclosure determines the lighting parameter information based on the real color parameter and the face skin color parameter, then uses the lighting parameter information to obtain the texture parameter (that is, the re-determined face skin color parameter), and then uses the texture parameter to perform lighting rendering on the to-be-rendered image to obtain the rendered image.

Figure 7:
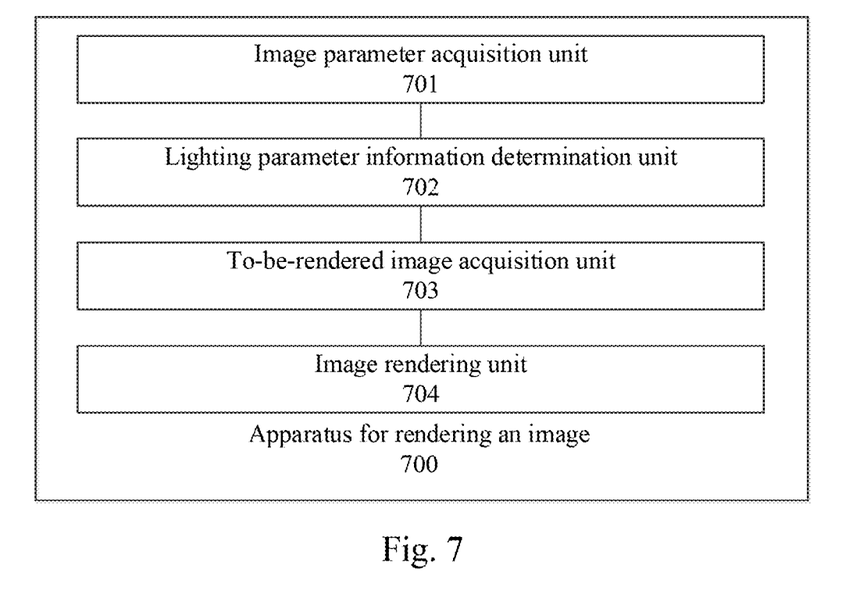
FIG. 7 is a schematic structural diagram of an apparatus for rendering an image according to an embodiment of the present disclosure.

As shown in FIG. 7, an apparatus 700 for rendering an image according to an embodiment of the present embodiment may include: an image parameter acquisition unit 701, configured to acquire a real color parameter and a face skin color parameter in a real user image, the real user image including a face image area; a lighting parameter information determination unit 702, configured to determine lighting parameter information based on the real color parameter and the face skin color parameter; a to-be-rendered image acquisition unit 703, configured to acquire a to-be-rendered image obtained based on the real user image; and an image rendering unit 704, configured to generate a texture parameter based on the lighting parameter information, and use the texture parameter to perform lighting rendering on the to-be-rendered image to obtain a rendered image.

In some alternative implementations of the present embodiment, the determining lighting parameter information based on the real color parameter and the face skin color parameter in the lighting parameter information determination unit 702, includes: determining the lighting parameter information using a spherical harmonic lighting algorithm based on the real color parameter and the face skin color parameter.

In some alternative implementations of the present embodiment, the determining the lighting parameter information using a spherical harmonic lighting algorithm based on the real color parameter and the face skin color parameter in the lighting parameter information determination unit 702, include: determining an estimated conversion coefficient based on a historical real user image; constructing a spherical harmonic lighting equation related to the lighting parameter information based on the estimated conversion coefficient, the real color parameter, and the face skin color parameter; and determining the lighting parameter information based on the spherical harmonic lighting equation.

In some alternative implementations of the present embodiment, the image rendering unit 704 further includes: a texture parameter update subunit, configured to use the texture parameter as an updated face skin color parameter; determine updated lighting parameter information based on the real color parameter and the updated face skin color parameter; and the image rendering unit is further configured to: determine an updated texture parameter based on the updated lighting parameter information, and use the updated texture parameter to perform lighting rendering on the to-be-rendered image to obtain the rendered image.

In some alternative implementations of the present embodiment, the image rendering unit 704 includes: re-determine the updated texture parameter as the updated face skin color parameter, and jump to execution of the determining the updated lighting parameter information based on the real color parameter and the updated face skin color parameter; and the image rendering unit is further configured to: determine, in response to a number of execution of the jumping meeting a predetermined threshold condition, a final updated texture parameter, and use the final updated texture parameter to perform lighting rendering on the to-be-rendered image to obtain the rendered image.

In some alternative implementations of the present embodiment, the acquiring a real color parameter and a face skin color parameter in a real user image in the image parameter acquisition unit 701, includes: acquiring the real color parameter and a predetermined face skin color parameter in the real user image.

The present embodiment exists as an apparatus embodiment corresponding to the foregoing method embodiment, and for the same content, reference may be made to the description of the foregoing method embodiment, and detailed description thereof will be omitted. According to the apparatus for rendering an image provided by embodiments of the present disclosure, the lighting parameter information is dynamically determined based on the skin color information in the real image, and the corresponding texture parameter is generated to realize dynamic rendering of the rendered image, reducing a sense of violation of the rendered image, and improving the image quality.

According to an embodiment of the present disclosure, an electronic device and a readable storage medium are also provided.

Figure 8:
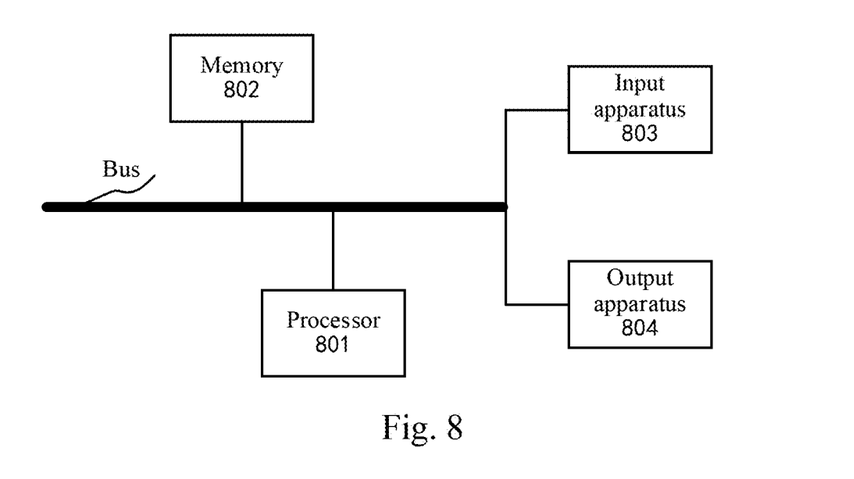
FIG. 8 is a block diagram of an electronic device for rendering an image suitable for implementing embodiments of the present disclosure.

As shown in FIG. 8, a block diagram of an electronic device of the method for rendering an image according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic device may be connected, and the devices provide some necessary operations, for example, as a server array, a set of blade servers, or a multi-processor system. In FIG. 8, one processor 801 is used as an example.

The memory 802 is a non-transitory computer readable storage medium provided by an embodiment of the present disclosure. The memory stores instructions executable by at least one processor, so that the at least one processor performs the method for rendering an image provided by embodiments of the present disclosure. The non-transitory computer readable storage medium of the present disclosure stores computer instructions for causing a computer to perform the method for rendering an image provided by embodiments of the present disclosure.

The memory 802, as a non-transitory computer readable storage medium, may be used to store non-transitory software programs, non-transitory computer executable programs and modules, such as program instructions/modules corresponding to the method for rendering an image in embodiments of the present disclosure (for example, the image parameter acquisition unit 701, the lighting parameter information determination unit 702, the to-be-rendered image acquisition unit 703 and the image rendering unit 704 as shown in FIG. 7). The processor 801 executes the non-transitory software programs, instructions, and modules stored in the memory 802 to execute various functional applications and data processing of the server, that is, to implement the method for rendering an image in the foregoing method embodiments.

The memory 802 may include a storage program area and a storage data area, where the storage program area may store an operating system and at least one function required application program; and the storage data area may store data created by the use of the electronic device for rendering an image. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device for rendering an image through a network. Examples of the above network include but are not limited to the Internet, intranet, local area network, mobile communication network, and combinations thereof.

The electronic device for rendering an image may further include: an input apparatus 803 and an output apparatus 804. The processor 801, the memory 802, the input apparatus 803, and the output apparatus 804 may be connected through a bus or in other methods. In FIG. 8, connection through the bus is used as an example.

The input apparatus 803 may receive input digital or character information, and generate key signal inputs related to user settings and function control of the electronic device for rendering an image such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, after a real color parameter and a face skin color parameter in a real user image of a face image area are acquired, lighting parameter information is determined based on the real color parameter and the face skin color parameter, a to-be-rendered image obtained based on the real user image is acquired, and a texture parameter is generated based on the lighting parameter information, and the texture parameter is used to perform lighting rendering on the to-be-rendered image to obtain a rendered image. Based on dynamic skin color information in the real image, the lighting parameter information is dynamically determined, and the corresponding texture parameter is generated to realize dynamic rendering of the rendered image, which reduces a sense of violation of the rendered image and improves the image quality.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for rendering an image, the method comprising:
    acquiring a real color parameter and a face skin color parameter in a real user image, the real user image comprising a face image area;
    determining lighting parameter information based on the real color parameter and the face skin color parameter;
    acquiring a to-be-rendered image obtained based on the real user image; and
    generating a texture parameter based on the lighting parameter information, and using the texture parameter to perform lighting rendering on the to-be-rendered image to obtain a rendered image, wherein the using the texture parameter to perform lighting rendering on the to-be-rendered image to obtain the rendered image, comprises:
    using the texture parameter as an updated face skin color parameter;
    determining updated lighting parameter information based on the real color parameter and the updated face skin color parameter; and
    determining an updated texture parameter based on the updated lighting parameter information, and using the updated texture parameter to perform the lighting rendering on the to-be-rendered image to obtain the rendered image.

2. The method according to claim 1, wherein the determining lighting parameter information based on the real color parameter and the face skin color parameter, comprises:
    determining the lighting parameter information using a spherical harmonic lighting algorithm based on the real color parameter and the face skin color parameter.

3. The method according to claim 2, wherein the determining the lighting parameter information using a spherical harmonic lighting algorithm based on the real color parameter and the face skin color parameter, comprises:

determining an estimated conversion coefficient based on a historical real user image;

constructing a spherical harmonic lighting equation related to the lighting parameter information based on the estimated conversion coefficient, the real color parameter, and the face skin color parameter; and     determining the lighting parameter information based on the spherical harmonic lighting equation.

4. The method according to claim 1, wherein the determining the updated texture parameter based on the updated lighting parameter information, and using the updated texture parameter to perform the lighting rendering on the to-be-rendered image to obtain the rendered image, comprises:

re-determining the updated texture parameter as the updated face skin color parameter, and jumping to execution of the determining the updated lighting parameter information based on the real color parameter and the updated face skin color parameter; and     determining, in response to a number of execution of the jumping meeting a predetermined threshold condition, a final updated texture parameter, and using the final updated texture parameter to perform the lighting rendering on the to-be-rendered image to obtain the rendered image.

5. The method according to claim 4, wherein the acquiring the real color parameter and the face skin color parameter in the real user image, comprises:

acquiring the real color parameter and a predetermined face skin color parameter in the real user image.

6. An electronic device, comprising:

at least one processor; and a memory, communicatively connected to the at least one processor, wherein, the memory, storing instructions executable by the at least one processor, the instructions, when executed by the at least one processor, cause the at least one processor to perform operations comprising:

acquiring a real color parameter and a face skin color parameter in a real user image, the real user image comprising a face image area;

determining lighting parameter information based on the real color parameter and the face skin color parameter;

acquiring a to-be-rendered image obtained based on the real user image; and     generating a texture parameter based on the lighting parameter information, and using the texture parameter to perform lighting rendering on the to-be-rendered image to obtain a rendered image, wherein the using the texture parameter to perform lighting rendering on the to-be-rendered image to obtain the rendered image, comprises:

using the texture parameter as an updated face skin color parameter;

determining updated lighting parameter information based on the real color parameter and the updated face skin color parameter; and     determining an updated texture parameter based on the updated lighting parameter information, and using the updated texture parameter to perform the lighting rendering on the to-be-rendered image to obtain the rendered image.

7. The electronic device according to claim 6, wherein the determining lighting parameter information based on the real color parameter and the face skin color parameter, comprises:

determining the lighting parameter information using a spherical harmonic lighting algorithm based on the real color parameter and the face skin color parameter.

8. The electronic device according to claim 7, wherein the determining the lighting parameter information using a spherical harmonic lighting algorithm based on the real color parameter and the face skin color parameter, comprises:

determining an estimated conversion coefficient based on a historical real user image;

constructing a spherical harmonic lighting equation related to the lighting parameter information based on the estimated conversion coefficient, the real color parameter, and the face skin color parameter; and     determining the lighting parameter information based on the spherical harmonic lighting equation.

9. The electronic device according to claim 6, wherein the determining the updated texture parameter based on the updated lighting parameter information, and using the updated texture parameter to perform the lighting rendering on the to-be-rendered image to obtain the rendered image, comprises:

re-determining the updated texture parameter as the updated face skin color parameter, and jumping to execution of the determining the updated lighting parameter information based on the real color parameter and the updated face skin color parameter; and     determining, in response to a number of execution of the jumping meeting a predetermined threshold condition, a final updated texture parameter, and using the final updated texture parameter to perform the lighting rendering on the to-be-rendered image to obtain the rendered image.

10. The electronic device according to claim 9, wherein the acquiring the real color parameter and the face skin color parameter in the real user image, comprises:

acquiring the real color parameter and a predetermined face skin color parameter in the real user image.

11. A non-transitory computer readable storage medium, storing computer instructions thereon, wherein the computer instructions, when executed by a processor, cause the processor to perform operations comprising:

acquiring a real color parameter and a face skin color parameter in a real user image, the real user image comprising a face image area;

determining lighting parameter information based on the real color parameter and the face skin color parameter;

acquiring a to-be-rendered image obtained based on the real user image; and     generating a texture parameter based on the lighting parameter information, and using the texture parameter to perform lighting rendering on the to-be-rendered image to obtain a rendered image, wherein the using the texture parameter to perform lighting rendering on the to-be-rendered image to obtain the rendered image, comprises:

using the texture parameter as an updated face skin color parameter;

determining updated lighting parameter information based on the real color parameter and the updated face skin color parameter; and     determining an updated texture parameter based on the updated lighting parameter information, and using the updated texture parameter to perform the lighting rendering on the to-be-rendered image to obtain the rendered image.

12. The storage medium according to claim 11, wherein the determining lighting parameter information based on the real color parameter and the face skin color parameter, comprises:
   determining the lighting parameter information using a spherical harmonic lighting algorithm based on the real color parameter and the face skin color parameter.

13. The storage medium according to claim 12, wherein the determining the lighting parameter information using a spherical harmonic lighting algorithm based on the real color parameter and the face skin color parameter, comprises:
   determining an estimated conversion coefficient based on a historical real user image;
   constructing a spherical harmonic lighting equation related to the lighting parameter information based on the estimated conversion coefficient, the real color parameter, and the face skin color parameter; and
   determining the lighting parameter information based on the spherical harmonic lighting equation.

14. The storage medium according to claim 11, wherein the determining the updated texture parameter based on the updated lighting parameter information, and using the updated texture parameter to perform the lighting rendering on the to-be-rendered image to obtain the rendered image, comprises:
   re-determining the updated texture parameter as the updated face skin color parameter, and jumping to execution of the determining the updated lighting parameter information based on the real color parameter and the updated face skin color parameter; and
   determining, in response to a number of execution of the jumping meeting a predetermined threshold condition, a final updated texture parameter, and using the final updated texture parameter to perform the lighting rendering on the to-be-rendered image to obtain the rendered image.

15. The storage medium according to claim 14, wherein the acquiring the real color parameter and the face skin color parameter in the real user image, comprises:
   acquiring the real color parameter and a predetermined face skin color parameter in the real user image.

* * * * *